United States Patent
Waselewski et al.

(10) Patent No.: US 8,756,202 B2
(45) Date of Patent: Jun. 17, 2014

(54) SYSTEM AND METHOD FOR LOGSTREAM ARCHIVAL

(75) Inventors: Charles F. Waselewski, Waldorf, MD (US); Michael D. Livingston, Germantown, MD (US)

(73) Assignee: CA, Inc., Islandia, NY (US)

( * ) Notice: Subject to any disclaimer, the term of this patent is extended or adjusted under 35 U.S.C. 154(b) by 846 days.

(21) Appl. No.: 12/102,618

(22) Filed: Apr. 14, 2008

(65) Prior Publication Data

US 2009/0259700 A1 Oct. 15, 2009

(51) Int. Cl.
*G06F 17/30* (2006.01)
*G06F 12/00* (2006.01)

(52) U.S. Cl.
CPC .............................. *G06F 17/30551* (2013.01)
USPC ........................................................ 707/672

(58) Field of Classification Search
CPC .......... G06F 11/3476; G06F 17/30551; G06F 17/30884; G06F 12/00
See application file for complete search history.

(56) References Cited

U.S. PATENT DOCUMENTS

| | | | |
|---|---|---|---|
| 5,668,991 A | 9/1997 | Dunn et al. | |
| 5,737,600 A | 4/1998 | Geiner et al. | |
| 6,131,190 A * | 10/2000 | Sidwell | 717/115 |
| 6,202,071 B1 * | 3/2001 | Keene | 1/1 |
| 6,295,541 B1 * | 9/2001 | Bodnar et al. | 1/1 |
| 6,446,086 B1 | 9/2002 | Bartlett et al. | |
| 7,260,590 B1 * | 8/2007 | Williams | 707/615 |
| 7,617,254 B2 * | 11/2009 | Loaiza et al. | 1/1 |
| 8,549,239 B2 * | 10/2013 | Cowham et al. | 711/161 |
| 2005/0102561 A1 | 5/2005 | Graham | |
| 2006/0218204 A1 | 9/2006 | Ofer et al. | |
| 2006/0248513 A1 | 11/2006 | Foster et al. | |
| 2007/0260908 A1 | 11/2007 | Mitchell et al. | |
| 2009/0013138 A1 * | 1/2009 | Sudhakar | 711/162 |
| 2009/0063548 A1 * | 3/2009 | Rusher et al. | 707/102 |
| 2009/0125563 A1 * | 5/2009 | Wong et al. | 707/200 |

OTHER PUBLICATIONS

"Dumps", [online]. [retrieved Feb. 6, 2008]. Retrieved from the Internet: <http://publib.boulder.ibm.com/infocenter/wmbhelp/v6r0m0/index.jsp?topic=/com.ibm.etools.mft.eb.doc/au14180_.htm>, 5 pgs.

* cited by examiner

*Primary Examiner* — Belinda Xue
(74) *Attorney, Agent, or Firm* — Schwegman, Lundberg & Woessner, P.A.

(57) ABSTRACT

A method of archiving data from a logstream includes determining a begin time parameter earlier in time than a last record obtained from the logstream of data. A request is sent for records from the logstream of data starting at the begin time parameter. Records are received from the logstream of data and selected records are archived.

12 Claims, 4 Drawing Sheets

SYSTEM AND METHOD FOR LOGSTREAM ARCHIVAL

BACKGROUND

In some systems, data can be optionally logged to a logstream using a system logger versus a traditional method of logging the data to multiple discrete files. When traditional logging is used, multiple discrete files are used, and when one fills up, a switch occurs. The full file is dumped and archived, ensuring that needed data is retained. The process of dumping the file may also clear the file so that it can be reused by the system to write data in the future. What is also provided by dumping the files is a clear demarcation of what data has been archived since each file represents a discrete set of data.

Logstream recording is different in that instead of individual files, there is a continuous stream of data that does not necessarily have a discrete demarcation of the start and end of the data. The logstream is not cleared when dumped; instead the older data is emptied from the logstream as it ages, while new data is added. Rather than being a set of data records, it is more like a queue of records that is emptied from the beginning as more are added to the end. Due to this method of processing, it is up to the archival process to manage which data has been archived.

SUMMARY

A method of archiving data from a logstream includes determining a begin time parameter earlier in time than a last record obtained from the logstream of data. A request is sent for records from the logstream of data starting at the begin time parameter. Records are received from the logstream of data and selected records are archived. In one embodiment, a computer readable medium has instructions that when executed by a computer, perform the method.

In a further embodiment, a machine implemented method of archiving data includes obtaining a timestamp corresponding to a last record obtained from a logstream of data. The timestamp is modified to an earlier point in time. Records are requested from the logstream starting about the earlier point in time and received from the logstream. A first record not previously archived is determined, and the first and succeeding records received are archived.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
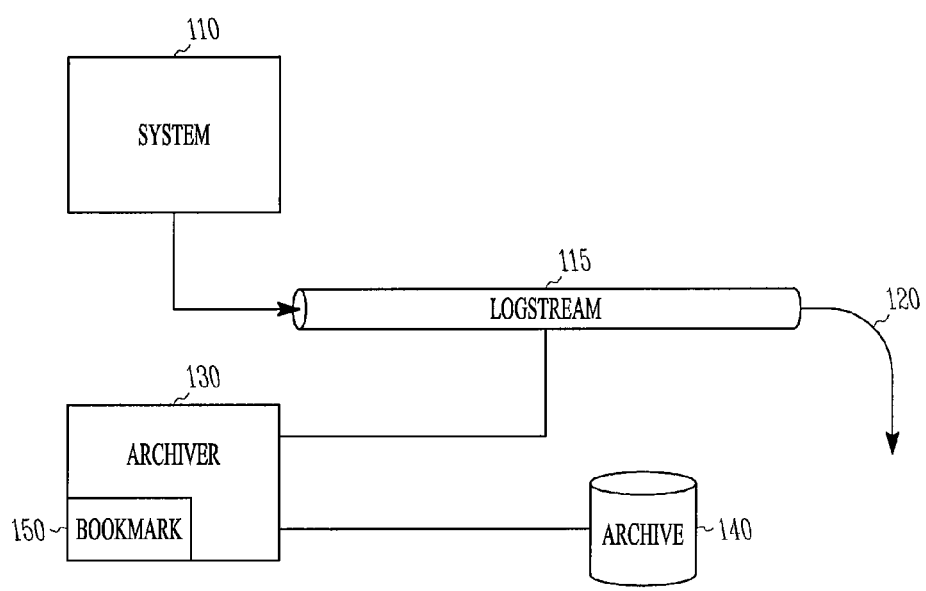
FIG. 1 is a block diagram of a system that archives records from a logstream according to an example embodiment.

FIG. 1 is a block diagram of a system 110 that produces records in a logstream 115. The records enter one end of the logstream 115, and after a specified amount of time or when the size of buffer or storage space allocated to the log is filled, data is removed or deleted as indicated by arrow 120. An archive process, or archiver 130, may be used to request a copy of records from the logstream 115 through use of a copy request utility. Records received in response to the request may be stored in an archive 140, which may be any type of storage device desired, such as memory, tape, disk drive, array, optical drive, or even networked storage device.

In one embodiment, the request for records from the logstream 115 may specify certain parameters, such as various time parameters corresponding to begin and end times or lengths of time, and may also specify types of files to copy, such as various types of system management facilities (SMF) files. Still further parameters may be available. In one embodiment, the time parameters may have a limited granularity, such as one minute in one example. At the same time, the records in the logstream may have timestamps associated with them that have a granularity of 0.01 seconds. In further embodiments, these time parameters and timestamps may have different granularities as desired. In some embodiments, multiple records may have the same timestamp. A bookmark 150 may be used to keep track of a time corresponding to the last record archived from logstream 115.

The logstream 115 may have a length of time specified for how long to keep data generated from system 110. In one embodiment, the length of time is one day. However, it may be a week, or longer in some embodiments, and even shorter in further embodiments.

Archiver 130 may be a program or method that runs in a system, such as system 110. The archiver 130 in one embodiment periodically generates requests for records from the logstream 115 in order to create an archive 140. It may be desirable for archive 140 to contain a complete log of data from the logstream 115 without duplicates. The complete log of data can be useful when accounting for resource utilization and in some accounting an chargeback schemes to properly allocate the costs of running system 110 to users. In one embodiment, the archived data comprises SMF data generated from IBM® z/OS operating systems. The archived data may also include other data from one or more systems. In still further embodiments, multiple logstreams may be kept with different types of data or even overlapping data as set up by users of the system 110.

Figure 2:
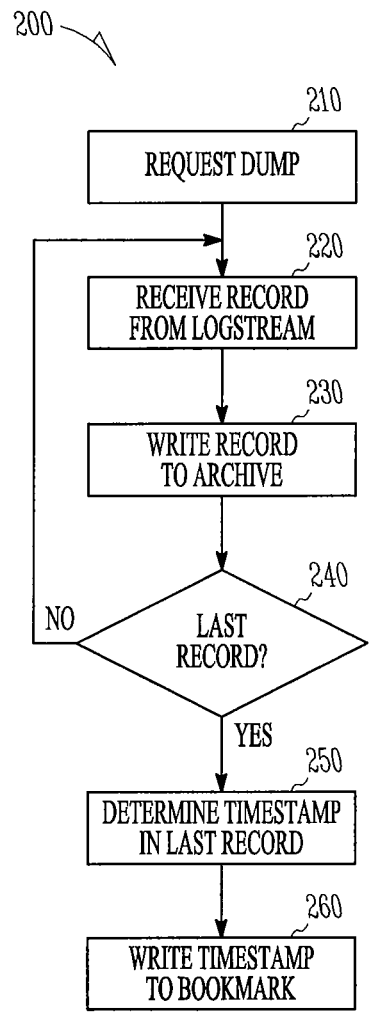
FIG. 2 is a flowchart illustrating a method of obtaining a first dump from the logstream shown in FIG. 1 according to an example embodiment.

FIG. 2 is a flowchart illustrating an example method 200 of obtaining a first dump from the logstream 115 shown in FIG. 1. In one embodiment, archiver 130 is set to request a dump at 210 from logstream 115. Method 200 represents the first time a copy of records is requested from the logstream. Since this is a first request, no parameters or operands need be specified in a copy utility request, resulting in the entire logstream being copied. At 220, a first record is received from the logstream 115. In one embodiment, it is the oldest record in the logstream 115. At 230, the record is written to the archive 140.

A check is made to determine whether the received record is the last record. The last record in this embodiment corresponds to the newest record written to the logstream 115 from system 110. If not, the next record is received at 220. If it was the last record at 240, the timestamp of the last record is determined at 250 and a timestamp is written to the bookmark 150. The bookmark thus corresponds to a logical boundary in the logstream 115 corresponding to the last data archived in archive 140.

Figure 3:
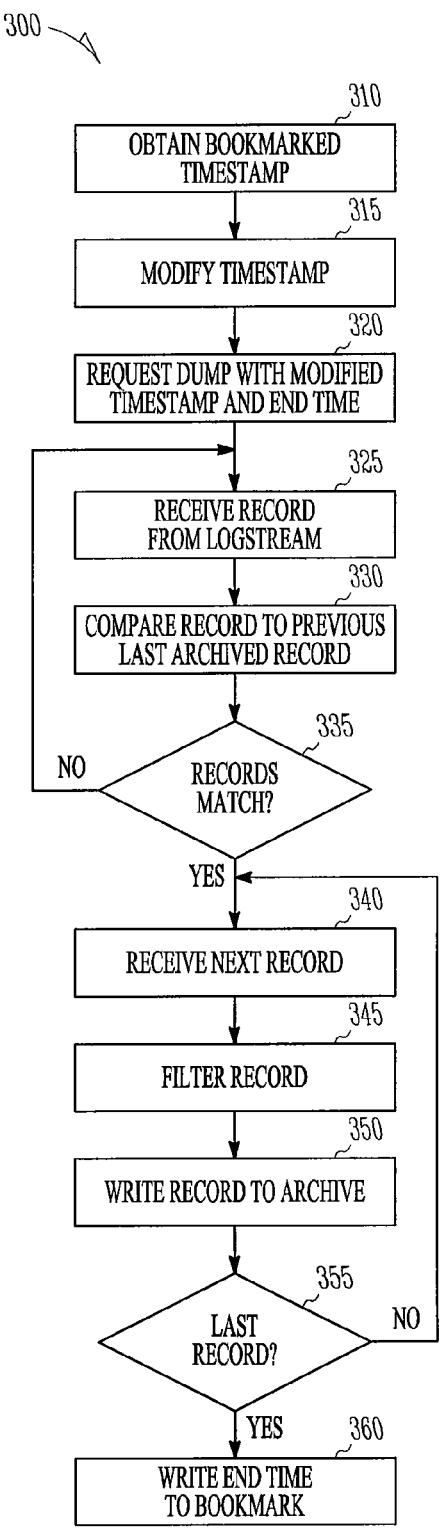
FIG. 3 is a flowchart illustrating a method of obtaining subsequent dumps from the logstream shown in FIG. 1 according to an example embodiment.

FIG. 3 is a flowchart illustrating a method 300 of obtaining subsequent dumps from the logstream shown in FIG. 1 according to an example embodiment. After the first dump is obtained utilizing method 200, the timestamp in bookmark 150 is obtained at 310, and indicates the time of the newest record from the logstream 115 that has been stored in the archive 140. However, as indicated above, the copy request utility may not provide for sufficient temporal granularity to precisely identify the newest archived record. Still further, their may be multiple records in the logstream with the same timestamp. To help ensure that records are not skipped, and are not duplicated in the archive 140, the timestamp is modified at 315. In one embodiment, a predetermined amount of time is subtracted from the timestamp to ensure that there is some overlap in the records to obtained by the copy utility request sent at 320 with the modified timestamp. The timestamp in one embodiment is modified as a function of the temporal granularity of the time parameters available in the copy utility, such as one minute.

At 325, a record is received from the logstream corresponding to the oldest record having the modified timestamp. At 330, the received record is compared to the newest record in the archive 140. Since more than one record in the logstream 115 may have the same timestamp, part of the record is also compared to part of the newest record in the archive 140. In one embodiment, 4K of each record is compared. The amount of record compared may be modified in further embodiments, and may include the entire record if desired.

If the records do not match at 335, the next record is obtained at 325 and the method repeats at 330 and 335. When the records do match as determined at 335, it is known that the most recently received record from the logstream 115 is the same as the newest record from the archive. At 340, the next record is received from the logstream. In one embodiment, the next record may be run through a filter at 345 to determine if it has a data type corresponding to the data being archived. Since the logstream 115 may have many different types of data, not all the date may need to be archived. In one embodiment, only data types corresponding to SMF data is desired to be archived.

Once past the optional filtering at 345, the record is written to the archive 350. A check is made at 355 to determine whether the last record has been received from the logstream 115 as a result of the request. In one embodiment, the request may specify a current time as a time to stop copying records and sending them to the archiver 130. In further embodiments, any other time may be specified as desired. If it is the last record, the end time is written to the bookmark 150 to serve as the next timestamp used in the next request. If the record is not the last record, the next record is received at 340, and processing continues in a loop until the last record is detected at 355. Writing of the end time to the bookmark 360 may occur proximate the time that the requested dump is sent at 320 if desired, or at any other convenient time.

In one embodiment, the filtering of the record at 345 is optional. Since a user can tailor a logstream to contain only data that is to be archived, no filtering need be done at archiver 130. In a further embodiment, method 300 is performed on a periodic basis, such as hourly. Such a period may provide the ability to decrease the amount of memory resources devoted to a logstream. Since the records in the logstream are archived every hour, or several times a day, the length of the logstream may be reduced from a week to a day without risking loss of data. In further embodiments, the length of the logstream may be shortened to less than a day if archived multiple times a day without risk of losing data.

Figure 4:
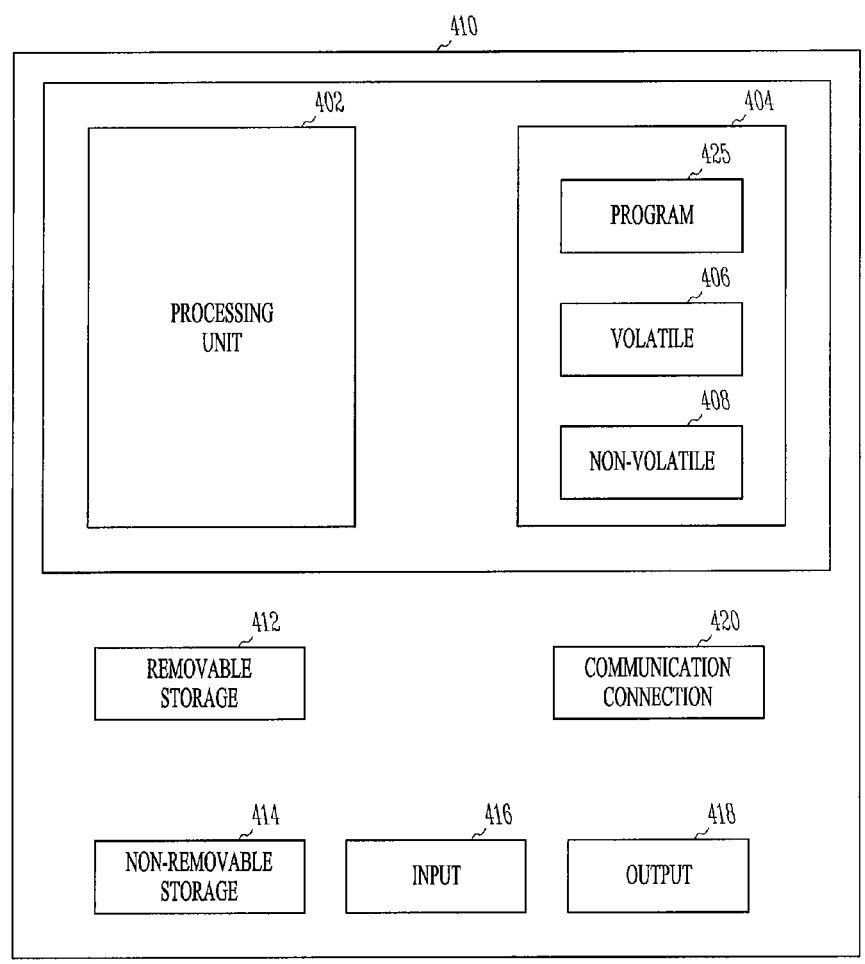
FIG. 4 is a block diagram of an example computer system capable of implementing methods according to an example embodiment.

FIG. 4 is a block diagram of an example computer system capable of implementing methods according to an example embodiment. A general computing device in the form of a computer 410, may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, and RAM are some examples of articles including a computer-readable medium.

In conclusion, a logstream archival process has been modified so that each run of the archival process will save a place holder for each system-logstream combination. That way, when the next archival process runs, the starting point for the next archival process run is established and the archive may be synchronized with the logstream. The end point for the archival process is also established in one embodiment, as being a predetermined time period, such as one minute, before the time the archival process started. This leads to clear, discrete demarcation of the data. The date and time information for the utility is generated automatically based on the place holder that has been saved in the previous archival process. By keeping a place holder, it may be determined exactly where to resume archiving.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A machine implemented method of archiving data into a storage device, the method comprising:
   obtaining a first timestamp corresponding to a last record archived from a logstream of data, the first timestamp indicating when the last record was received at the logstream and is recorded as a bookmark in the storage device, the logstream of data including records stored in order according to when a record of the records was received at the logstream, wherein the logstream of data comprises a continuous stream of data without discrete demarcation of a start and an end of the data, and wherein each record includes a timestamp indicating when the record was received at the logstream;
   modifying the first timestamp to an earlier point in time;
   requesting records from the logstream that include a second timestamp indicating a time at the earlier point in time and requesting records from the logstream that include a third timestamp indicating a time after the earlier point in time and before the first timestamp;
   receiving the requested records from the logstream;
   determining a first record of the requested records received that has not previously been archived, wherein the first record includes the timestamp indicating when the first record was received at the logstream;
   archiving the first record not previously archived;
   archiving the requested records received that include a timestamp that is the same as the timestamp indicating when the first was received at the logstream and the requested records received that include a timestamp that indicates a time after the timestamp indicating when the first record was received at the logstream; and
   recording the third timestamp with the bookmark.

2. The method of claim 1 wherein requesting records from the logstream further includes specifying an end time, and wherein the end time is stored as the third timestamp.

3. The method of claim 1, wherein determining a first record not previously archived comprises comparing received records to the last record stored from a previous request for records.

4. The method of claim 3 wherein comparing the records comprises comparing an amount of data in each record, including the timestamp indicating when the record was received at the logstream.

5. The method of claim 1 wherein the earlier point in time is a predetermined amount of time corresponding to temporal granularity limitations of the request for records.

6. The method of claim 5 wherein the predetermined amount of time is one minute.

7. The method of claim 6 wherein the timestamp indicating when the record was received at the logstream has a granularity of at least 0.01 seconds.

8. The method of claim 5 wherein multiple records have the same timestamp indicating when the multiple records were received at the logstream.

9. The method of claim 1 and further comprising filtering received records prior to archiving.

10. The method of claim 9 wherein filtering records identifies System Management Facilities (SMF) records for archiving.

11. A non-transitory computer readable storage device storing computer readable instructions for causing a computer to execute a method comprising:
    obtaining a first timestamp corresponding to a last record archived from a logstream of data, the first timestamp indicating when the last record was received at the logstream and is recorded as a bookmark in the storage device, the logstream of data including records stored in order according to when a record of the records was received at the logstream, wherein the logstream of data comprises a continuous stream of data without discrete demarcation of a start and an end of the data, and wherein each record includes a timestamp indicating when the record was received at the logstream;
    modifying the first timestamp to an earlier point in time;
    requesting records from the logstream that include a second timestamp indicating a time at the earlier point in time and requesting records from the logstream that include a third timestamp indicating a time after the earlier point in time and before the first timestamp;
    receiving the requested records from the logstream;
    determining a first record of the requested records received that has not previously been archived, wherein the first record includes the timestamp indicating when the first record was received at the logstream;
    archiving the first record not previously archived;
    archiving the requested records received that include a timestamp that is the same as the timestamp indicating when the first was received at the logstream and the requested records received that include a timestamp that indicates a time after the timestamp indicating when the first record was received at the logstream; and
    recording the third timestamp with the bookmark.

12. The non-transitory computer readable storage device of claim 11 further comprising instructions for causing the computer to:
    filter received records prior to archiving.

* * * * *